US007736231B2

(12) United States Patent
Evans et al.

(10) Patent No.: US 7,736,231 B2
(45) Date of Patent: Jun. 15, 2010

(54) COMMON CONTROLLER

(75) Inventors: C. Shane Evans, Duvall, WA (US);
Khanh Tan Le, Puvallup, WA (US);
Matthew L. Coill, Duvall, WA (US);
Peter M. Wiest, Issaquah, WA (US);
Roderick M. Toll, Sammamish, WA
(US); Aaron L. Culbreth, Bellevue, WA
(US); Tyson Storey, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 724 days.

(21) Appl. No.: 11/263,761

(22) Filed: Oct. 31, 2005

(65) Prior Publication Data

US 2007/0078002 A1 Apr. 5, 2007

Related U.S. Application Data

(60) Provisional application No. 60/723,195, filed on Oct. 3, 2005.

(51) Int. Cl.
*A63F 9/24* (2006.01)
(52) U.S. Cl. .................. 463/36; 463/37; 273/148 B
(58) Field of Classification Search .................. 463/43, 463/36, 37; 273/148 B; 713/187; 707/104.1, 707/100; 710/315; 370/259; 345/168
See application file for complete search history.

(56) References Cited

U.S. PATENT DOCUMENTS 5,624,117 A * 4/1997 Ohkubo et al. .......... 273/148 B
5,807,175 A * 9/1998 Davis et al. .................. 463/36
6,044,428 A * 3/2000 Rayabhari .................. 710/305
6,238,289 B1 * 5/2001 Sobota et al. ................. 463/39
6,279,906 B1 * 8/2001 Sanderson et al. ...... 273/148 B
6,881,147 B2 * 4/2005 Naghi et al. .................. 463/35
2003/0069074 A1 * 4/2003 Jackson ....................... 463/43
2004/0111755 A1 * 6/2004 Perlman ...................... 725/133
2005/0113169 A1 * 5/2005 Danieli et al. ................. 463/36
2006/0172801 A1 * 8/2006 Hussaini et al. ............... 463/39
2006/0286943 A1 * 12/2006 Vance et al. ............... 455/90.1

OTHER PUBLICATIONS

International Patent Application No. PCT/US2006/038843, Notification of Transmittal of the International Search Report and the Written Opinion of the International Searching Authority, or the Declaration and International Search Report, Dated Feb. 20, 2007.

* cited by examiner

*Primary Examiner*—Peter DungBa Vo
*Assistant Examiner*—Masud Ahmed
(74) *Attorney, Agent, or Firm*—Woodcock Washburn LLP

(57) ABSTRACT

A common game controller is compatible with multiple platforms including game devices and general purpose processors. The common controller can be utilized by both developers and users. Game software can easily be implemented on multiple platforms. Common source code can be developed and compiled to run on multiple systems, for example XBOX 360®, WINDOWS XP®, and WINDOWS® VISTA. Users only have to learn and get familiar with a single game controller. The common controller includes a Universal Serial Bus (USB) compatible interface allowing the controller to be coupled to multiple types of platforms. The common controller can also include a wireless interface.

19 Claims, 4 Drawing Sheets

COMMON CONTROLLER

CROSS REFERENCE TO RELATED APPLICATIONS

This application claims benefit of Provisional Patent Application No. 60/723,195, filed Oct. 3, 2005, entitled "COMMON CONTROLLER," and is hereby incorporated by reference in its entirety.

TECHNICAL FIELD

The technical field generally relates to controllers and more specifically relates to a game controller for use with multiple platforms such as game devices and general purpose processors.

BACKGROUND

Users of general purpose processors, such as a personal computer (PC) for example, who want to play games on their PCs, have several control devices from which to choose. These control devices include joysticks, game pads, steering wheels, flight yokes, gloves, head trackers, and first-person-shooter controllers, for example. But, there is no standard governing how data provided by all these controllers should be interpreted by the game application being executed on the PC. Interpreting this data is a difficult challenge for game developers and as a result game developers often tend to support only a keyboard and a mouse as control devices. Keyboards and mice were not designed for gaming, and do not provide a very sophisticated suited of controls. A user's gaming experience can be greatly diminished when playing a game using only a keyboard and/or a mouse. This is especially so if the user is familiar with playing the game on a game device having a dedicated controller.

SUMMARY

This Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter. A common game controller is compatible with multiple platforms, such as XBOX 360 and a PC for example, provides a consistent game experience to both users and developers. The common controller can be utilized by both developers and users on multiple platforms having multiple operating systems and applications, such as XBOX 360®, WINDOWS XP® and WINDOWS® VISTA for example, to provide a consistent game pad for developers to develop software and for uses to play games on multiple platforms. The common controller includes a Universal Serial Bus (USB) compatible interface allowing the controller to be coupled to multiple types of platforms. The common controller can also include a wireless interface, such as a BLUETOOTH® compatible interface for example. Use of the common controller allows game software to be implemented on multiple platforms while taking advantage of all the data available from the controller. Common source code can be developed that can be compiled to run on multiple systems, for example XBOX 360®, WINDOWS XP®, and WINDOWS® VISTA. Use of the common controller allows users to become familiar with only a single game controller for use with multiple platforms.

BRIEF DESCRIPTION OF THE DRAWINGS

The following description is better understood when read in conjunction with the appended drawings. For purposes of illustrating the common controller, there is shown in the drawings exemplary constructions of the common controller; however, the common controller is not limited to the specific methods and instrumentalities disclosed. In the drawings.

DETAILED DESCRIPTION OF ILLUSTRATIVE EMBODIMENTS

A controller that can be used by both developers and users with multiple operating systems and applications, such as XBOX 360® and WINDOWS® provides a consistent game pad for developers to develop software and for users to play games on multiple platforms. The common controller comprises an interface compatible with multiple platforms. In an exemplary embodiment, the common controller comprises a USB compatible interface, a wireless interface, or a combination thereof. Game software can easily be implemented on multiple platforms. Common source code can be developed that can be compiled to run on multiple systems, for example XBOX 360®, WINDOWS XP®, and WINDOWS® VISTA. Users only have to learn and get familiar with a single game controller.

Provided herein is a description of an exemplary embodiment of a common controlling system as applied to XBOX 360®, WINDOWS XP®, and WINDOWS® VISTA. The application of the common controlling system is not be limited thereto, but is applicable to other types of platforms and operating systems. The following description of a common controller and common controlling system for use with XBOX 360®, WINDOWS XP®, and WINDOWS® VISTA is an example of the more general application of the common controller. Note the terms "common controller" and "gamepad" also are used interchangeably throughout.

Figure 1:
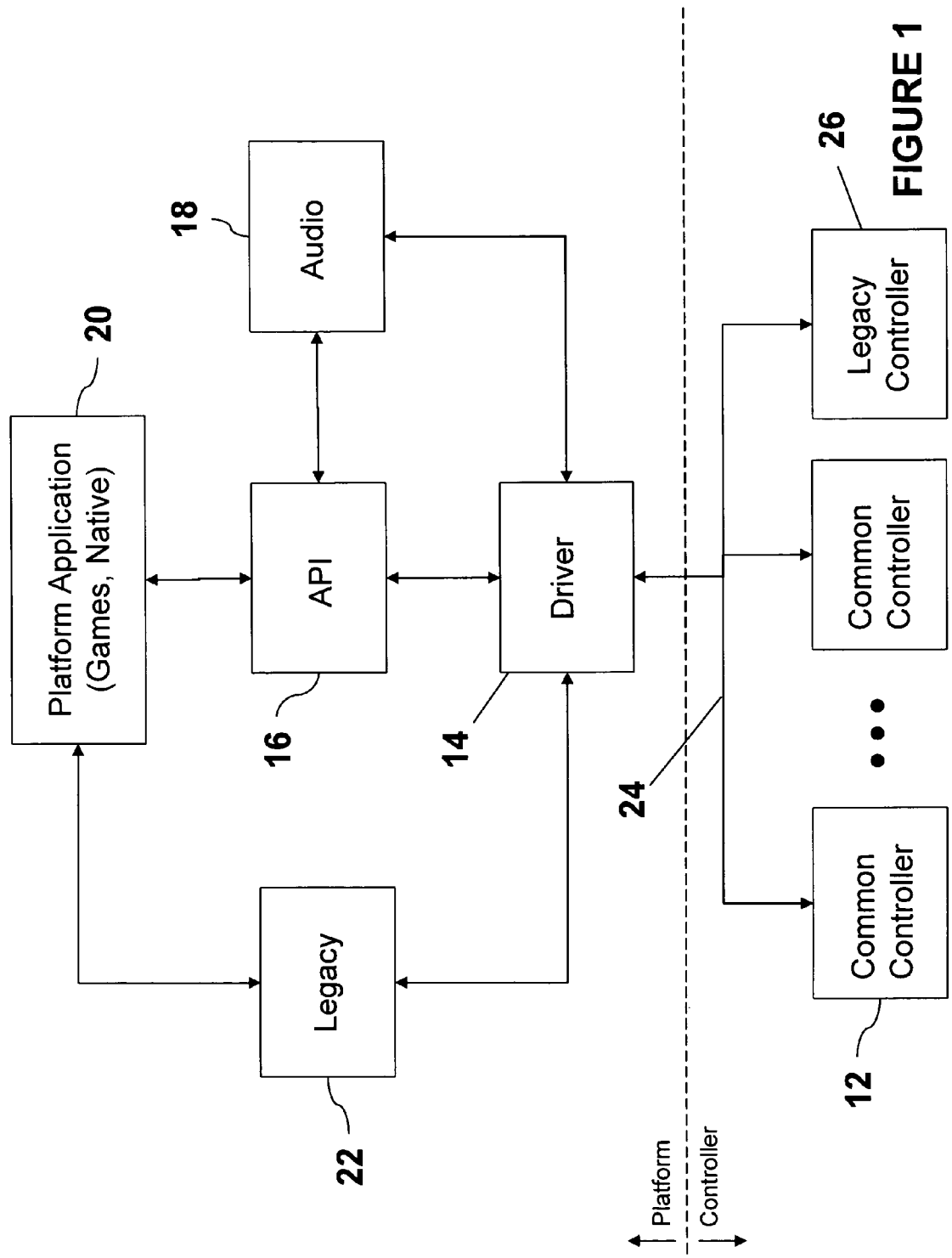
FIG. 1 is an illustration of an exemplary common controlling system.

FIG. 1 is a block diagram of an exemplary common controlling system. As shown in FIG. 1, the common controlling system comprises at least one common controller 12, a driver 14, and an application programming interface (API) 16. Each common controller 16 is compatible with a plurality of platforms. In an exemplary embodiment, the plurality of platforms includes a game device (e.g., XBOX 360®) and general purpose processor, such as a personal computer (PC), and the like. The general purpose processors are capable of running general purpose operating systems (e.g., WINDOWS XP®, WINDOWS® VISTA). Note that the general purpose operating systems have not been specifically tailored for game applications, but are capable of supporting game applications. The common controlling system includes a driver 14 that is compatible with the common controller 12 and interfaces with the API 16. The API 16 interfaces the driver 14 to an application (such as a game application or other non-game application) that is installed on the platform and to be controlled by the common controller 12. In an exemplary embodiment, upon installing the common controller driver 14 in the general purpose processor, the user can play games and execute non-game applications running on the general purpose processor using the common controller 12.

The driver 14 receives data from each common controller 12. The driver 14 interprets the received data and translates the data as required. The driver 14 provides the translated data to the API 16. The driver 14 also is capable of being utilized with legacy system 22. For example, if a user is using a legacy controller 26 (other than the common controller 12), such as a joystick for example, the driver 14 is capable of receiving data from the joystick, interpreting the received data, translating the data as appropriate, and providing the translated data to the legacy (existing) system for providing information to the application 20 being executed by the platform. Other legacy control devices, such as a keyboard and a mouse also are compatible with the driver 14. Example control devices supported by the common controlling system include the common controller coupled by a wired coupling means, the common controller coupled by a wireless coupling means, a wheel, a joystick, an arcade stick, skate boards, a dancepad, fishing, a text input device, a headset (Wired), a headset (Wireless), or a combination thereof. Note that typically, a driver is made for a specific device or class of devices. For example, a keyboard and/or mouse are in their own device class and therefore have their own drivers. The driver 14 is compatible common controller devices (12). Significantly however, the driver 14 can expose control devices to the platform via the API 16 or the legacy system (having an API) 22. Thus a legacy controller 26 can have a separate driver, or class driver, and be interfaced to the legacy system 22.

The common controller 12 is coupled to the platform via interface 24. The interface 24 can comprise any appropriate interface, such a wired interface, a wireless interface, or a combination thereof. In an exemplary embodiment, the interface 24 comprises a Universal Serial Bus (USB) interface.

The API 16 received translated data from the driver 14 and makes that data available to the platform application 20 as needed. The platform application 20 can comprise any appropriate application, such as a game application, a non-game application, or a combination thereof, for example. The API 16 also is capable of making audio information (depicted by block 18) available to the application 20. Voice and/or other audio information can be provided from/to a user via the common controller 12. The user can chat with other users via the audio interface. In an exemplary embodiment, the user can control the application 20 via the audio interface. For example, a user can activate an application 20 via the audio interface.

In an exemplary embodiment, coupling an audio device to the common controller 12 enumerates the audio device (Audio device not shown in FIG. 1). The common controlling system enumerates a device by recognizing the device determining its physical port assignment. For example, in an exemplary embodiment, when the common controller 12 is coupled to the platform without a headset, microphone, or other type of audio device, no audio device is enumerated by the common controlling system. Once the headset/microphone is plugged into the common controller 12, the audio device is enumerated by the common controlling system. The audio device is recognized by the common controlling system, the driver 14 logically assigns a port to the audio device, and an interface is established between the audio device and the common controlling system. In an exemplary embodiment, the audio device remains active whether or not the headset/microphone becomes subsequently unplugged.

In an exemplary embodiment, the common controller driver 14 is compatible with an XBOX 360® controller (a controller that can be use to control an XBOX 360® game device). When the driver 14 is installed on platforms comprising WINDOWS XP® or WINDOWS® VISTA, the XBOX 360® controller is compatible with the platform and the operating system therein. In this exemplary embodiment, the user can connect the XBOX 360® controller to a PC via a USB port on the PC. The user can then play games, via the XBOX 360® controller, that are being executed by the platform operating under WINDOWS XP® or WINDOWS® VISTA.

The API 16 determines the current state of all the connected controllers 12. For example, the API 16, via the driver 14, determines the state of the buttons and controls of each common controller 12. The API 16 also maps API logical identifiers (IDs) to physical controller IDs. That is, the API 16 assigns a logical ID to each to each port to which a controller is coupled. In an exemplary embodiment, the assignment of ID's is performed because the list of controllers in the driver 14 is determined by the order in which the controllers are coupled to the platform. While the logical IDs in the API 16 are determined in accordance with the order in which the controllers are first used. A controller is in a used state when the controller is used, such as moving a joystick or depressing a button, for example. The API 16 translates data received from the driver 14 and makes the translated data available to the platform application 20. The API 16 also provides an indication to each controller of the all controller assignments. For example, the API 16 provides a signal to each controller 12, via the driver 14, of the platform assignment of each controller coupled to the platform. Each controller 12 comprises means for indicating the controller assignments. In an exemplary embodiment, each controller 12 comprises a visual indicating means (e.g., light emitting diodes (LEDs) or liquid crystal display (LCD)) for indicating the port assignment (configuration status) of each controller 12.

In an exemplary embodiment, the controller state information is stored (cached) to alleviate the need to wait for an update every time the platform application 20 requests controller state information. It is envisioned that a platform application will request controller state information for each controller, each iteration of the platform application. In one implementation, the API 16 queries the driver every game request for controller state information. The driver 14 responds with the cached data rather than wait for new data to arrive. If the response provided by the driver is cached data, the response is label as such.

Figure 2:
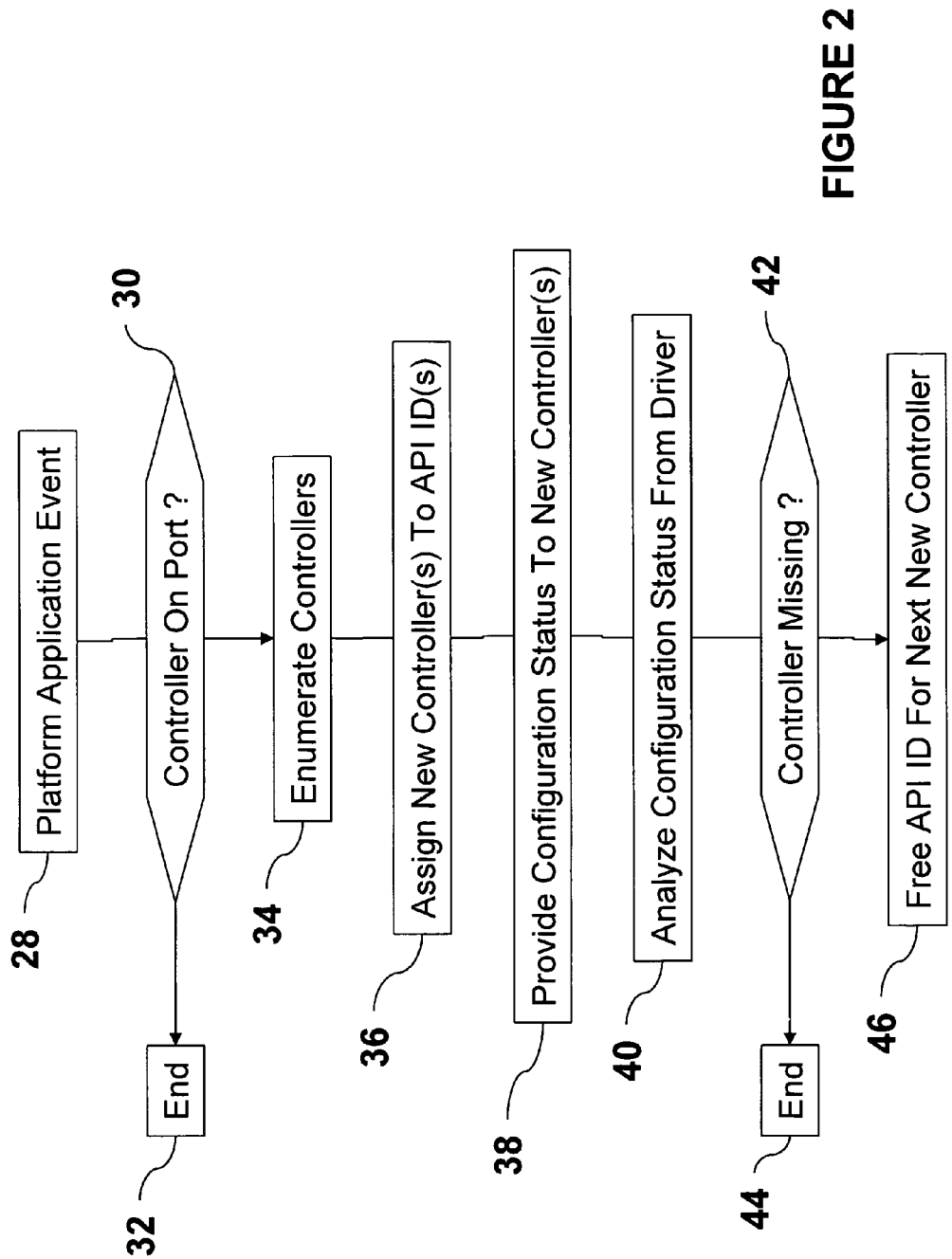
FIG. 2 is a flow diagram of an exemplary process for obtaining information about each controller and assigns IDs.

FIG. 2 is a flow diagram of an exemplary process for obtaining information about each controller and assigned IDs. The process is triggered by a predetermined event in the platform application at step 28. For example, the platform application can be expecting an input from a specific controller. In one exemplary embodiment, prior to step 28, the API obtains, via the driver, information about the configuration status, such as the number of controllers coupled to the platform, the current state of each coupled controller, and whether the vibration mode or LED mode is set on each coupled controller. In another exemplary embodiment, no information is provided until the application makes a call for information.

The API, via the driver determines if the specific controller is coupled to a port of the platform at step 30. If the specific controller is coupled to the port, the process of assigning IDs ends at step 32. If it is determined (step 30) that the specific controller is not coupled to the platform, the controllers are enumerated at step 34. That is, all platform ports are analyzed to determine if controllers are coupled thereto, and the coupling status is remembered. The physical IDs of the new controller, or controllers, are assigned to the first open API IDs at step 36. The configuration status is provided to the new controller, or controllers, at step 38. For example, a new controller can be provided information needed to illuminate its LED displays indicating port assignments of coupled controllers. The configuration status stored in the driver is analyzed at step 40. If it is determined (step 42) that a controller is no longer coupled to the platform, the configuration status stored in the driver is updated at step 46. The API ID is freed for use with the next new controller. If it is determined (step 42) that no controllers are missing, the process of assigning IDs ends at step 46.

In an exemplary embodiment, the API resets the controller states when the platform application is finished. In an exemplary embodiment, this includes turning off the Rumble (vibration mode) feature on the controllers, and also resetting the LEDs to an "Off" state. The driver enumerates the coupled controllers, queries for the types and amount of child devices each controller can support, and exposes active children devices to the operating system of the platform. For example, the driver can enumerate two controllers, one having a microphone/headset (child device) connected thereto. The driver exposes the microphone/headset to the operating system (e.g., WINDOWS XP®) of the platform.

Figure 3:
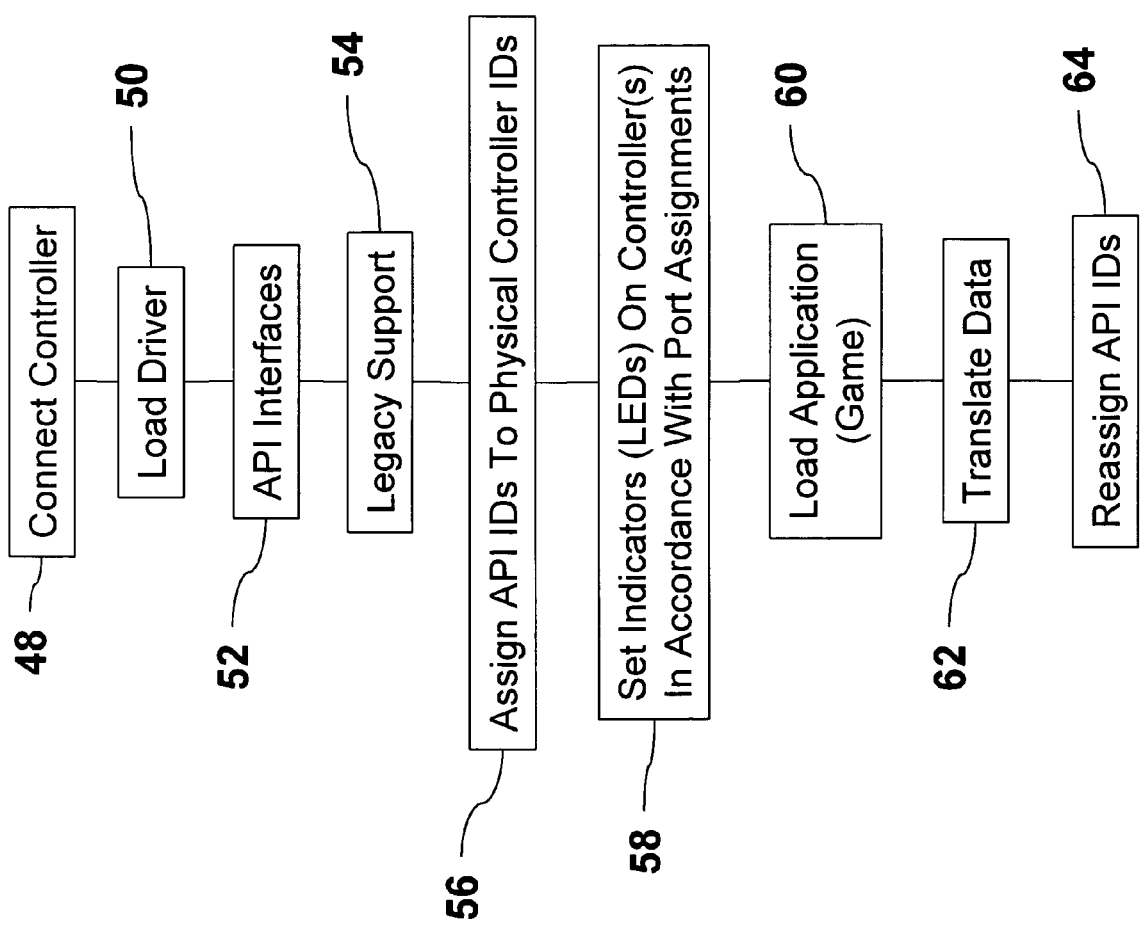
FIG. 3 is a flow diagram of an exemplary process for controlling an application utilizing the common controller.

FIG. 3 is a flow diagram of an exemplary process for controlling an application utilizing the common controller. At least one common controller is coupled to one of a plurality of platforms at step 48. Each common controller is compatible with the plurality of platforms. In an exemplary embodiment, the plurality of platforms includes a game device (e.g., XBOX 360®) and a general purpose processor (e.g., a PC). The general purpose processors can have any appropriate operating system. In an exemplary embodiment, at least one platform has an operating system that was not tailored for game applications (e.g., WINDOWS XP® or WINDOWS® VISTA). For example, the common controller is compatible with an XBOX 360® device, a processor running WINDOWS XP®, and a processor running WINDOWS® VISTA.

At step 50, the driver is installed/loaded into the platform to which the common controller (or common controllers) is coupled. Interfaces between the API and the driver are created at step 52. This assumes that the API has been installed into the platform. If the API has not been installed, the API also is installed at step 52. Any interfaces and/or components needed to support legacy operations are loaded at step 54. The API provides the interface between the driver and the application. API IDs are assigned to physical controller IDs for each controller coupled to the platform at step 56. Indicators on each coupled controller are set at step 58. The indicators on the controllers provide an indication of the number of controllers coupled to the platform and the port assigned to each controller. The indicating means can include any appropriate means such as a visual means (e.g., LED or LCD), an audio means, a mechanical means (e.g., vibration), or a combination thereof. The application is loaded and/or invoked at step 60. Note that the sequence of steps in FIG. 3 is exemplary. For example, in another exemplary embodiment, logical port assignments and setting controller indicators is not done until after the application is loaded. As the coupled controllers and the application communicate, data provided by the controllers to the driver is passed to the API and translated by the API so that the data is usable by the application at step 62. Also at step 62, data provided by the application is translated by the API and provided to the driver, which in turn provides the translated data to the controllers. As predetermined events occur in the application, the controllers are re-enumerated and API IDs are reassigned in accordance with any change in controller configuration.

Figure 4:
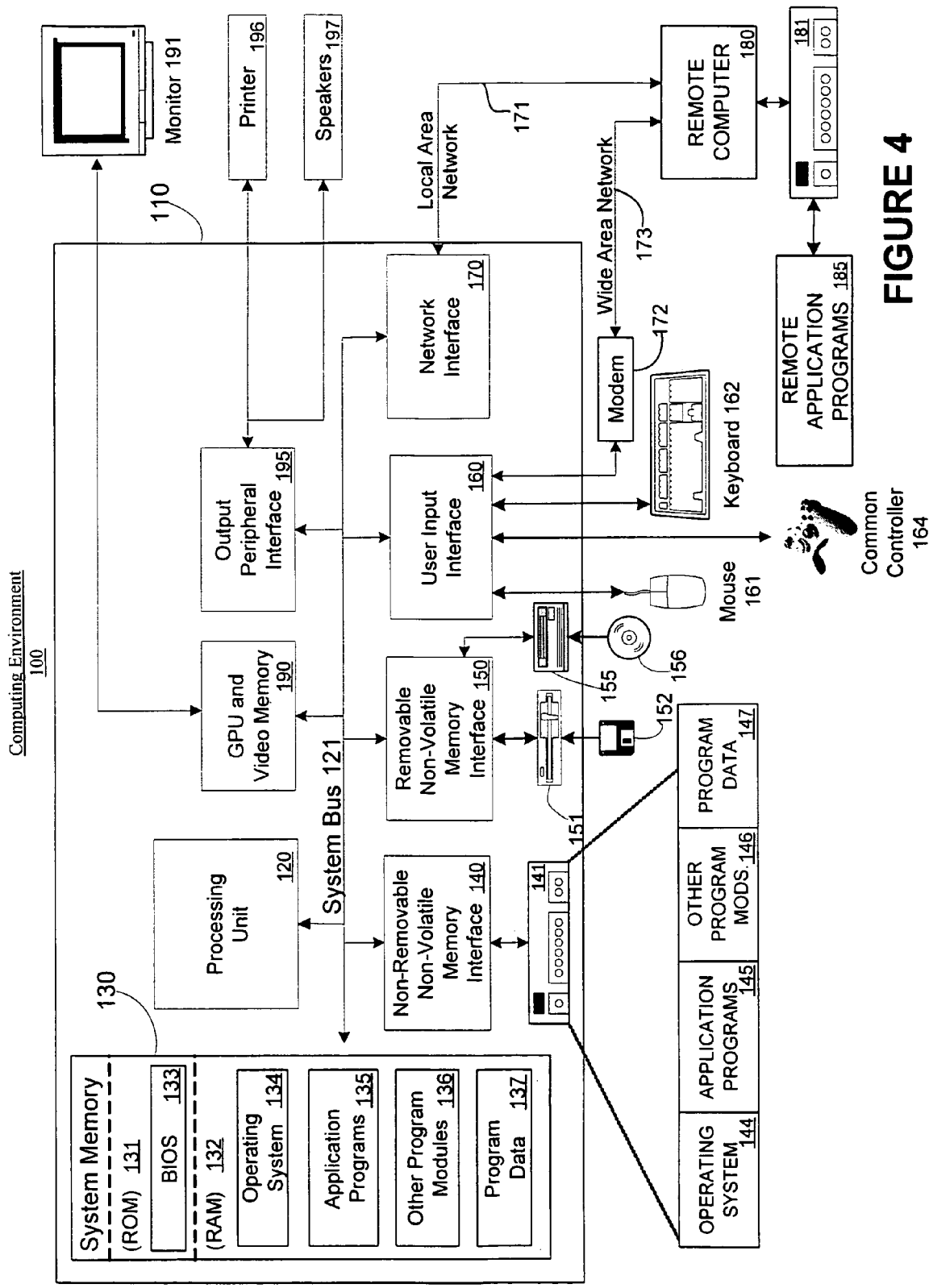
FIG. 4 is an illustration of a suitable computing system environment on which a common controller can be implemented.

While exemplary embodiments of a common controller have been described in connection with various computing devices, the underlying concepts can be applied to any computing device or system capable of controlling multiple platforms comprising a game device and a general purpose processor with a common controller. FIG. 4 illustrates an example of a suitable computing system environment 100 on which a common controller can be implemented. The computing system environment 100 is only one example of a suitable computing environment and is not intended to suggest any limitation as to the scope of use or functionality of the common controller. Neither should the computing environment 100 be interpreted as having any dependency or requirement relating to any one or combination of components illustrated in the exemplary operating environment 100. Although one embodiment of the common controller can include components illustrated in the exemplary operating environment 100, another more typical embodiment of the common controller excludes non-essential components.

With reference to FIG. 4, an exemplary system for implementing the common controller includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Additionally, components of the computer 110 may include a memory cache 122. The processing unit 120 may access data from the memory cache more quickly than from the system memory 130. The memory cache 122 typically stores the data most recently accessed from the system memory 130 or most recently processed by the processing unit 120. The processing unit 120, prior to retrieving data from the system memory 130, may check if that data is currently stored in the memory cache 122. If so, a "cache hit" results and the data is retrieved from the memory cache 122 rather than from the generally slower system memory 130.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136 and program data 137.

The computer 110 may also include other removable/non-removable, volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, a microphone, a keyboard 162, the common controller 164, and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but can be connected by other interface and bus structures, such as a parallel port, game port or a universal serial bus (USB). In an exemplary embodiment, the common controller 164 is connected to user input interface 160 via a USB port. A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 195 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet. For example, in the common controlling system, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

The common controlling system describe herein is applicable to game applications. Many games do not play well with a keyboard and mouse. The common controller provides a means for users to play games on platforms utilizing WINDOWS® operating systems. The common controller is applicable to both users and developers. In an exemplary scenario involving a user, a user can receive a common controller and a few new games as a gift for the holidays. The user can install the driver for the controller and the games on her general purpose processor. She then plugs in the common controller to a USB port on her general purpose processor and uses the common controller to play the new games that came optimized to work well with common controller. Later on the user finds that she can also configure existing games to work well with the common controller. In another exemplary scenario involving a developer, a developer works for a gaming company that generates sports titles for both the XBOX 360 and PCs. The developer is new to the company and has been tasked with implementing setup and game input for his cross-platform title. He develops high level software for the XBOX 360 and, upon completion, can port this high level software to the PC. Also, the developer has the ability to incorporate voice and text input into the game because all the controllers are compatible therewith.

It is envisioned that utilizing a common controller for game applications can reduce the work needed to develop game applications for both game devices and general purposes processors. It is also envisioned that utilizing a common controller for game applications will increase the popularity of using PCs as game machines.

The various techniques described herein can be implemented in connection with hardware or software or, where appropriate, with a combination of both. Thus, the methods and apparatus for a common controller, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing memory management. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for a common controller also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing a method for controlling an application via a common controller. When implemented on a general-purpose processor, the program code combines with the processor to provide a unique apparatus that operates to invoke the functionality of a common controller. Additionally, any storage techniques used in connection with a common controller can invariably be a combination of hardware and software.

A common controlling system typically includes at least some form of computer readable media. Computer readable media can be any available media that can be accessed by a common controller. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by a common controller. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

While a common controller has been described in connection with the exemplary embodiments of the various figures, it is to be understood that other similar embodiments can be used or modifications and additions can be made to the described embodiments for performing the same functions of a common controlling system without deviating therefrom. Rather, the specific features and acts described above are disclosed as example forms of implementing the claims. Therefore, the common controlling system as described herein should not be limited to any single embodiment, but rather should be construed in breadth and scope in accordance with the appended claims.

What is claimed:

1. A common controlling apparatus comprising:
   a controller compatible with a plurality of platforms, said plurality of platforms comprising a game device and a general purpose processor;
   a first software component for receiving data from and interfacing said controller with a second software component, wherein said first software component is compatible with a plurality of different controllers including said controller and is compatible with said plurality of platforms, and said first software component comprises a driver; and
   said second software component for interfacing said first software component with a respective platform of the plurality of platforms, said second software component comprising an application programming interface.

2. An apparatus in accordance with claim 1, wherein said controller comprises a game controller.

3. An apparatus in accordance with claim 1, wherein said second software component is capable of interfacing said first software component with an operating system of said respective platform.

4. An apparatus in accordance with claim 1, wherein:
   each game device comprises an operating system tailored for game applications;
   each general purpose processor comprises an operating system tailored for non-game applications; and
   said second software component is capable of interfacing said first software component with a respective operating system of a respective platform.

5. An apparatus in accordance with claim 1, wherein said controller is coupleable to a platform via at least one of a universal serial bus compatible interface and a wireless interface.

6. An apparatus in accordance with claim 1, wherein said controller is capable of controlling game applications and non-game applications.

7. An apparatus in accordance with claim 1, wherein said controller is capable of providing:
   at least one of an audio, a visual, and a mechanical indication of a status of an application being controlled by said controller; and
   a visual indication of an assignment of controllers coupled to a platform.

8. An apparatus in accordance with claim 1, wherein said controller is capable of receiving audio information and providing voice information.

9. An apparatus in accordance with claim 8, wherein said voice information is capable of being used for at least one of controlling an application and voice communications.

10. A method for controlling an application, said method comprising:
   coupling at least one controller to a platform selected from a plurality of platforms, each controller being compatible with said plurality of platforms, said plurality of platforms comprising at least one of a game device and a general purpose processor;
   providing a first software component for receiving data from and interfacing said at least one controller with a second software component, said first software component being compatible with a plurality of different controllers including each coupled controller and being compatible with said plurality of platforms and said first software component comprising a driver;
   providing said second software component for interfacing said first software component with said coupled platform, said second software component comprising an application programming interface; and
   controlling, via said at least one coupled controller, an application being executed by said coupled platform.

11. A method in accordance with claim 10, further comprising:
   assigning an identifier to each coupled controller;
   providing, on each coupled controller, an indication of all assigned identifiers;
   reassigning an identifier to each coupled controller responsive to an occurrence of at least one predetermined event in said application being executed by said coupled platform; and
   providing, on each coupled controller, an indication of all reassigned identifiers.

12. A method in accordance with claim 10, wherein:
   said controller comprises a game controller;
   each game device comprises an operating system tailored for game applications;
   each general purpose processor comprises an operating system tailored for non-game applications;
   said first software component comprises a driver; and
   said second software component comprises an application programming interface for interfacing said driver to an operating system of said coupled platform.

13. A method in accordance with claim 10, further comprising coupling said at least one controller to said selected via at least one of a universal serial bus compatible interface and a wireless interface.

14. A method in accordance with claim 10 wherein said controller is capable of controlling game applications and non-game applications.

15. A computer-readable medium having computer-executable instructions that when executed by a personal computer perform operations comprising:
   receiving input data from a gamepad coupled to the personal computer at a driver executing on the personal computer, the driver associated with the gamepad, wherein the gamepad and the driver are compatible with the personal computer and a game device and wherein the driver is compatible with a plurality of different gamepads;
   translating the input data by the driver for an application programming interface executing on the personal computer, the application programming interface associated with an application executing on the personal computer; and
   providing the translated input data by the driver to the application programming interface.

16. A computer-readable medium in accordance with claim 15, wherein the application is one of a game application or a non-game application.

17. A computer-readable medium in accordance with claim 15, wherein the input data includes audio data received via the gamepad for controlling the application.

18. A computer-readable medium in accordance with claim 15, wherein:
   the game device comprises an operating system tailored for game applications; and
   the personal computer comprises a general purpose operating system not tailored for game applications.

19. A computer-readable medium in accordance with claim 15, said computer-readable medium having further computer-executable instructions for:
   assigning an identifier to the gamepad being one of a plurality of gamepads coupled to the personal computer;
   providing, on each gamepad, an indication of all assigned identifiers;
   reassigning an identifier to each gamepad responsive to an occurrence of at least one predetermined event in said application being executed by said coupled personal computer; and
   providing, on each gamepad, an indication of all reassigned identifiers.

* * * * *

UNITED STATES PATENT AND TRADEMARK OFFICE
CERTIFICATE OF CORRECTION

| | | |
|---|---|---|
| PATENT NO. | : 7,736,231 B2 | |
| APPLICATION NO. | : 11/263761 | |
| DATED | : June 15, 2010 | |
| INVENTOR(S) | : C. Shane Evans et al. | |

It is certified that error appears in the above-identified patent and that said Letters Patent is hereby corrected as shown below:

In column 11, line 16, in Claim 10, delete "platforms and" and insert -- platforms, and --, therefor.

Signed and Sealed this
First Day of February, 2011

David J. Kappos
*Director of the United States Patent and Trademark Office*